US011187801B2

(12) United States Patent
Dzikowicz (10) Patent No.: US 11,187,801 B2
(45) Date of Patent: Nov. 30, 2021

(54) SPIRAL SONAR

(71) Applicant: The Government of the United States of America, as represented by the Secretary of the Navy, Arlington, VA (US)

(72) Inventor: Benjamin R. Dzikowicz, Arlington, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 307 days.

(21) Appl. No.: 16/406,105

(22) Filed: May 8, 2019

(65) Prior Publication Data

US 2019/0346564 A1    Nov. 14, 2019

Related U.S. Application Data

(60) Provisional application No. 62/668,956, filed on May 9, 2018.

(51) Int. Cl.
*G01S 15/42* (2006.01)
*G01S 15/58* (2006.01)
(Continued)

(52) U.S. Cl.
CPC ............ *G01S 15/42* (2013.01); *G01S 7/524* (2013.01); *G01S 7/527* (2013.01); *G01S 7/539* (2013.01); *G01S 15/58* (2013.01)

(58) Field of Classification Search
CPC .......... G01S 15/42; G01S 7/524; G01S 7/527; G01S 7/539; G01S 15/58
See application file for complete search history.

(56) References Cited

U.S. PATENT DOCUMENTS

2012/0263031 A1\* 10/2012 Prothero ............. H04L 27/3494
                                                                    370/204
2016/0363664 A1\* 12/2016 Mindell .................. G01S 13/79

OTHER PUBLICATIONS

Benjamin R. Dzikowicz, and Brian T. Hefner, A spiral wave front beacon for underwater navigation: Transducer prototypes and testing, 2012, Acoustical Society of America, (Year: 2012).\*
(Continued)

*Primary Examiner* — Isam A Alsomiri
*Assistant Examiner* — Abdallah Abulaban
(74) *Attorney, Agent, or Firm* — US Naval Research Laboratory; Suresh Koshy (57) ABSTRACT

An apparatus including a uniplanar sonar head. The uniplanar sonar head includes at least one probe element being configured to output cooperatively a unipolar spiral probe signal. The uniplanar sonar head includes at least one reference element being configured to output a circular reference signal. The uniplanar sonar head includes an acoustic receiver comprising an input channel being configured to receive a reflected unipolar spiral probe signal and a reflected circular reference signal. The apparatus includes a plurality of amplifiers communicating with the at least one probe element, the at least one reference element, and the acoustic receiver. The apparatus includes a processor cooperating with the plurality of amplifiers. The apparatus includes a computer-readable medium storing instructions including a target-detection method, which includes determining an angular position of the target based on the plurality of acoustic echoes received via the input channel.

10 Claims, 3 Drawing Sheets

(51) Int. Cl.
G01S 7/539 (2006.01)
G01S 7/524 (2006.01)
G01S 7/527 (2006.01)

(56) References Cited

OTHER PUBLICATIONS

Dzikowicz, et al., A Spiral Wave Front Beacon for Underwater Navigation: Transducer Prototypes and Testing, The Journal of the Acoustical Society of America, May 2012, pp. 3748-3754, vol. 13, No. 5, AIP Publishing, College Park, MD, USA.
Dzikowicz, et al., Underwater Acoustic Navigation Using a Beacon with a Spiral Wave Front, IEEE Journal of Oceanic Engineering, Jan. 2015, pp. 177-186, vol. 40, No. 1, IEEE, Piscataway, NJ, USA.

* cited by examiner

SPIRAL SONAR

CROSS-REFERENCE TO RELATED APPLICATIONS

The present application claims priority to U.S. Provisional Patent Application Ser. No. 62/668,956, which was filed on 9 May 2018 and is incorporated herein by reference.

BACKGROUND OF THE INVENTION

Field of the Invention

This invention relates in general to an apparatus for active sonar, and in particular to an apparatus for spiral wave font sonar.

Description of the Related Art

Traditional single-ping active sonar systems rely on spatial aperture and time-of-flight to resolve the location of scatterers in its field of view. To achieve greater resolution, the aperture must be populated with a large number of hydrophones (or, less commonly acoustic projectors). Scatterer position is determined by looking at the phase difference (or equivalently, time-of-flight differences) between channels. Thus, conventional single-ping active sonar have a large number of input (or output) channels to achieve a resolution needed for the complex tasks demanded of them. Because each channel requires digitization hardware and software, this adds greatly to system complexity. Modem forward-looking sonars can have up to 512 separate input channels.

Conventional multi-ping active sonars, such as side-scan and synthetic aperture sonars stitch together multiple send and receive pairs as the sonar moves through space to generate an image an image or determine the position of scatterers. Such conventional multi-ping active sonars can have fewer channels than conventional single-ping sonars, but they do not operate in real time, unlike conventional single-ping sonars. Additionally, such conventional multi-ping active sonars need to retain a large amount of data to reconstruct the final product.

BRIEF SUMMARY OF THE INVENTION

Spiral wave front sonar according to an embodiment of the invention operates by transmitting a spiral signal whose phase varies by $2\pi$ over the transducer's azimuthal plane and a reference signal whose range is constant over the transducer's plane. For the purpose of this patent application, range is defined by time-of-flight and aspect by comparing the echoes from each transmission. For the purpose of this patent application, aspect is defined as the horizontal angle between the direction of the acoustic transducer and the target. In addition, the spectral response of the target is available for classification algorithms.

Embodiments of the invention include single-ping active sonar that is able to provide range and aspect to acoustic targets using a limited number of channels. Conventional single-ping active sonar uses high numbers of channels to populate a spatial aperture, whereas embodiments of the invention use an outgoing spiral wave form signal and a reference signal, which together are generated using as few as three outgoing channels. The backscattered return is decoded from a single channel hydrophone.

Two embodiments of the invention include inventive spiral sonar systems (e.g., spiral transducer array, hydrophone receiver, amplifiers, and/or data acquisition modules). A first spiral sonar system uses a transmit array capable of emitting both a circular (reference) and spiral (probe) acoustic signal. A second spiral sonar system uses a transmit/receive switch to utilize the reference element as a hydrophone, further reducing the number of physical channels.

An embodiment of the invention can be used wherever more conventional sonars are used. However, because a single channel is used on return in the above-mentioned embodiments of the invention, these embodiments of the invention have decreased complexity; and lower cost; they outperform conventional sonars in sparse environments.

Spiral sonar according to an embodiment of the invention is, for example, particularly useful in sparse environments where few scatterers are present. Examples of applications of the instant invention include underwater applications and in-air applications. Examples of applications of the instant invention include forward-looking sonars for obstacle avoidance for unmanned underwater vehicles ("UUVs") or submarines, fish-finders, swimmer or diver detection systems, and robotic interior-building navigation.

A salient feature of spiral sonar according to an embodiment of the invention is that the complexity of hardware and data acquisition is much lower than that of conventional imaging sonars, such as multi-beam, side scan, and synthetic aperture sonars. Due to the elegance of the hardware design, it is able to be deployed at a much lower cost than such conventional sonars. For example, an embodiment of the invention uses a small number of channels (e.g., as few as three) to achieve the real-time special resolution of a conventional single-ping active sonar with a large number of channels.

DETAILED DESCRIPTION OF THE INVENTION

Figure 1:
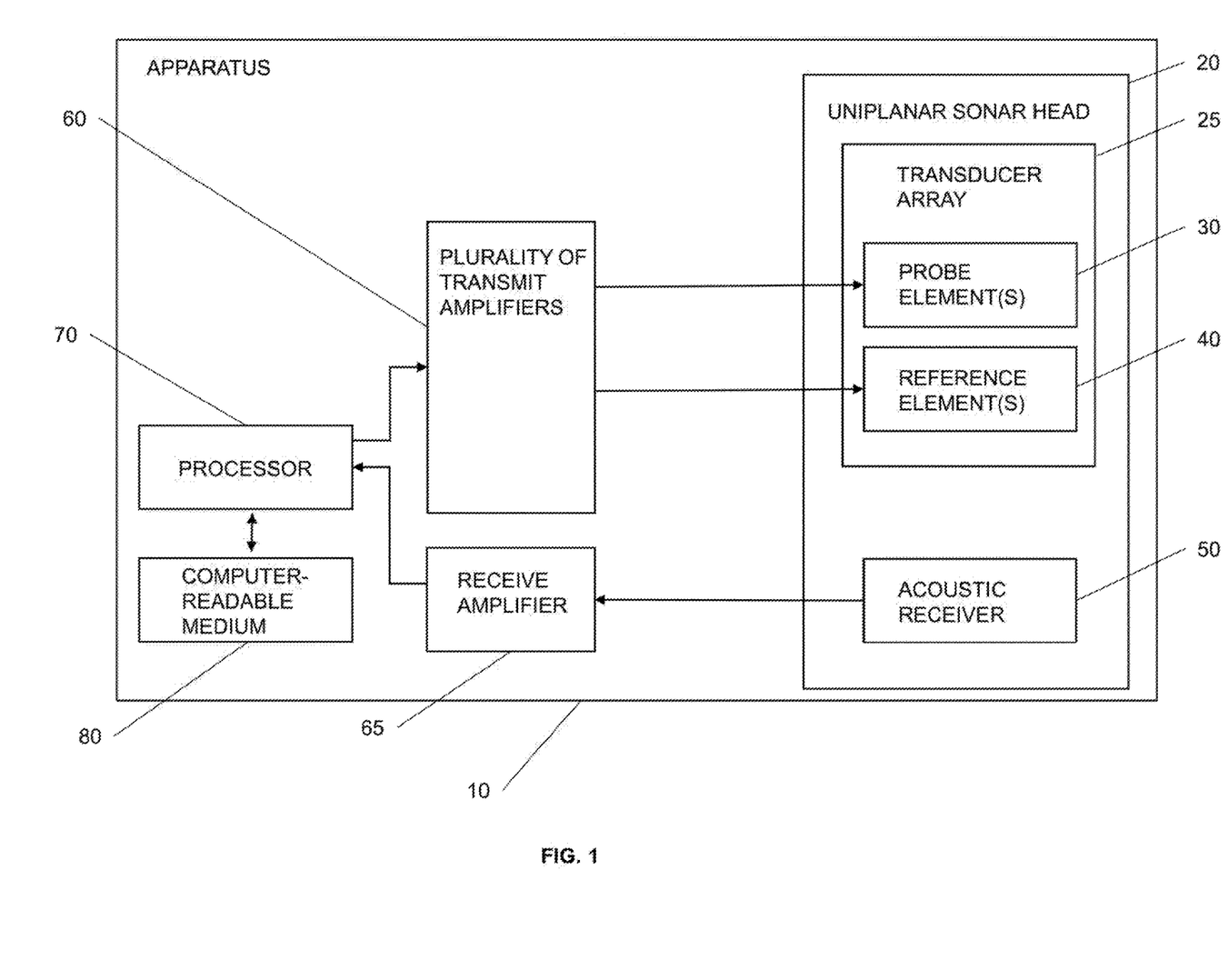
FIG. 1 is a block diagram of an apparatus according to an embodiment of the invention.

An embodiment of the invention includes an apparatus 10 for active sonar and is described as follows by way of example in FIGS. 1 and 2. The apparatus 10 includes a standard uniplanar sonar head 20. The uniplanar sonar head 20 includes a transducer array 25 for the transmission of acoustic signals. The transducer array 25 includes at least one standard acoustic probe element 30. Although the at least one probe acoustic probe element optionally includes a plurality of acoustic probe elements, for ease of understanding of FIGS. 1 and 2, only one acoustic probe element is shown. The at least one probe element 30 is configured to output cooperatively a unipolar spiral probe signal that comprises a spiral acoustic wavefront having a phase that varies linearly with angular position in a plane across at least one frequency. The transducer array 25 also includes at least one standard reference element 40. Although the at least one acoustic reference element optionally includes a plurality of acoustic reference elements, for ease of understanding of FIGS. 1 and 2, only one acoustic reference element is shown. The at least one acoustic reference element 40 is configured to output a circular reference signal that comprises a circular acoustic wavefront having a constant phase relative to angular position in the plane across the at least one frequency. The unipolar sonar head 20 further includes at least one standard acoustic receiver 50. Although the at least one standard acoustic receiver optionally includes a plurality of standard acoustic receivers, for ease of understanding of FIG. 1, only one acoustic receiver is shown. Examples of the acoustic receiver 50 include a standard hydrophone and a standard microphone. The acoustic receiver 50 includes an input channel configured to receive a reflected unipolar spiral probe signal and a reflected circular reference signal. The reflected unipolar spiral probe signal and the reflected circular reference signal include a plurality of acoustic echoes respectively generated by the outputted spiral probe signal and the outputted circular reference signal. The apparatus 10 additionally includes a plurality of standard transmit amplifiers 60, for example as shown in FIG. 1. The plurality of amplifiers 60 communicate with the at least one probe element 30 and the at least one reference element 40. A receive amplifier 65 communicates with the acoustic receiver 50. The apparatus 10 also includes a processor 70 cooperating with the plurality of transmit amplifiers 60 to generate electrical signals to drive the at least one probe element 30 and the at least one reference element 40 and with the receive amplifier 65 to record the input channel for further processing. Optionally, the outputted unipolar spiral probe signal and the outputted circular reference signal are transmitted simultaneously. The apparatus 10 further includes a computer-readable medium 80 storing instructions that, when executed by the processor 70, cause the processor to carry out a method for detecting a target. The method is described as follows by way of example in FIG. 3. An angular position of the target is determined based on the plurality of acoustic echoes received via the input channel. For the purpose of this patent application, the angular position of the target is defined as the angle between the target and a reference angle, typically the angle where the phase of the probe signal matches that of the reference signal.

Figure 2:
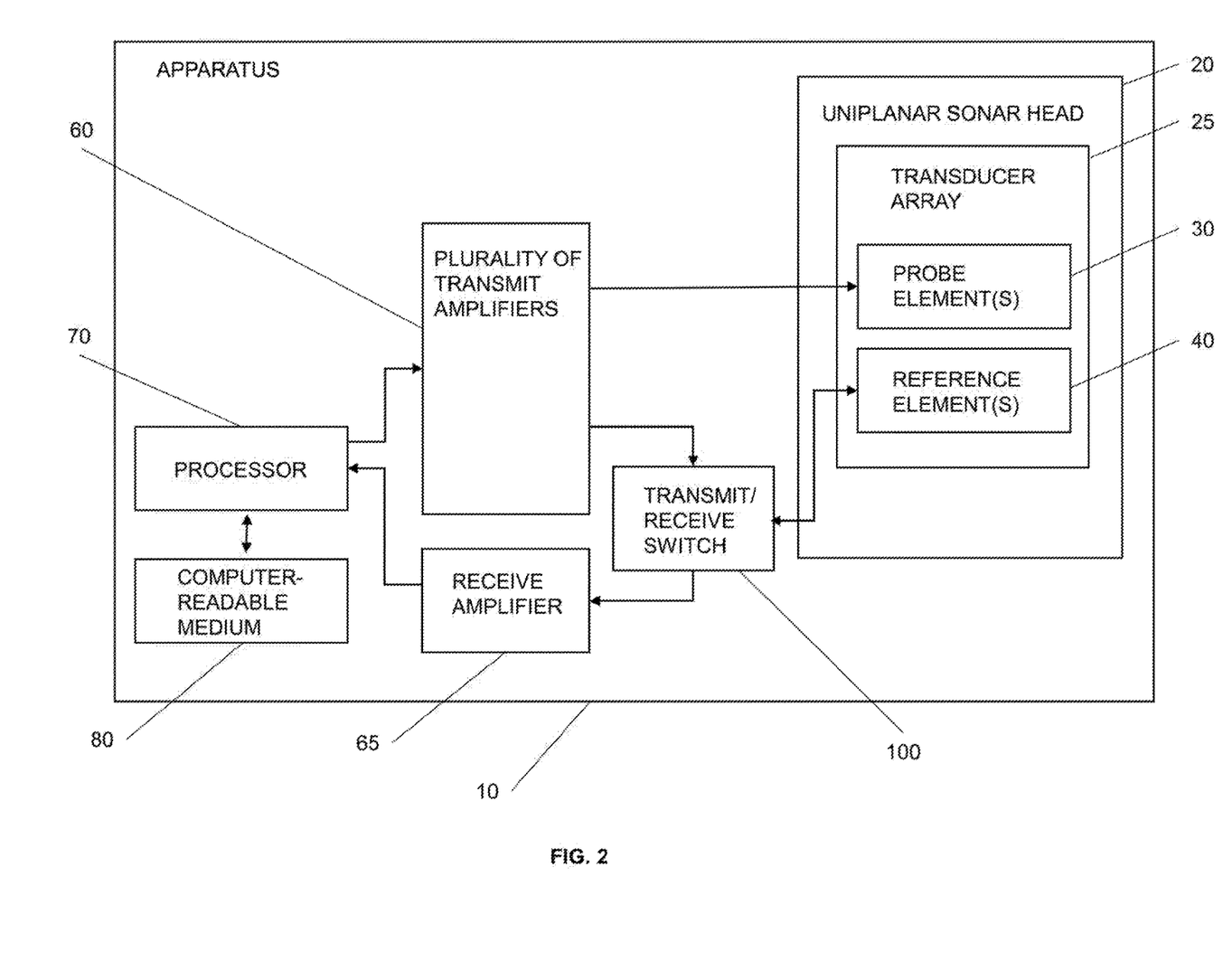
FIG. 2 is a block diagram of an apparatus according to another embodiment of the invention.

Optionally, the apparatus 10 can utilize the at least one reference element 40 as the acoustic receiver 50 as shown in FIG. 2. For example, the at least one reference element 40 is a standard reciprocal transducer and can act as a standard hydrophone. The apparatus further includes a standard transmit-receive switch 100, shown in FIG. 2, cooperating with the processor 70 to switch operation of the at least one reference element 40 from transmission mode to reception mode immediately after transmission.

Figure 3:
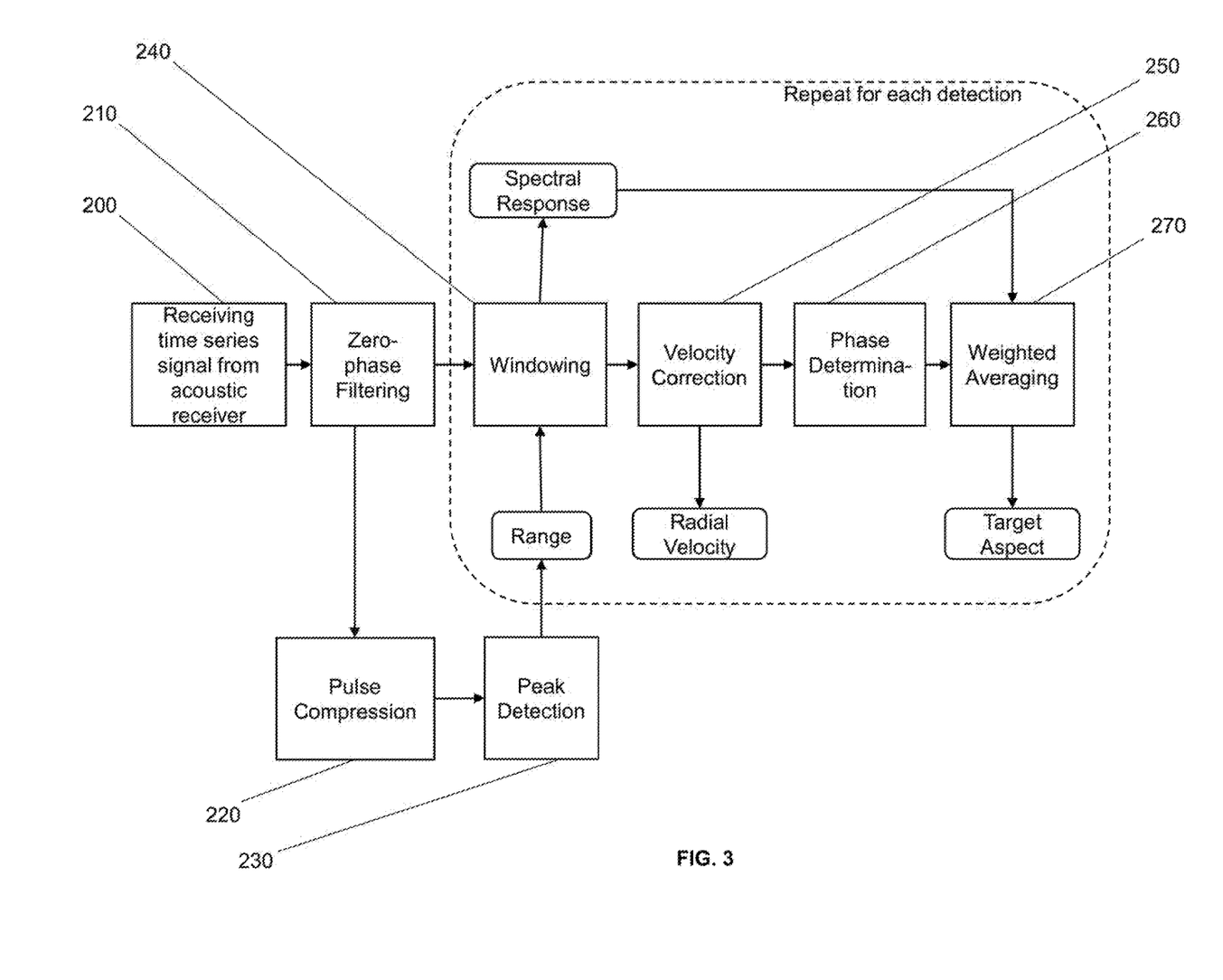
FIG. 3 is a functional diagram of a method according to an embodiment of the invention of determining a range, a radial velocity, and/or an aspect of a target.

Optionally, the method further comprises transmitting the outputted unipolar spiral probe signal and the outputted circular reference signal sequentially. Determining the angular position of the target includes determining a phase shift difference between the reflected unipolar spiral probe signal and the reflected circular reference signal by comparing their respective phase responses. That is, the phase response of the reflected unipolar spiral probe is compared with the phase response of the reflected circular reference signal. The angular position corresponds to a phase difference between the reflected unipolar spiral probe signal and the phase of the reflected circular reference signal. Optionally, the at least one reflected reference signal includes at least two reflected reference signals. The method further includes determining a relative radial velocity between the target and a source by measuring a Doppler shift between the at least two reflected reference signals. Optionally, determining the angular position of the target includes correcting the angular position for a Doppler shift between the reflected unipolar spiral probe signal and the at least one reflected circular reference.

Optionally, the reflected unipolar spiral probe signal and the reflected circular reference signal are combining to form an interference pattern. The input channel is configured to receive the interference pattern. The method further includes transmitting the outputted unipolar spiral probe signal and the outputted circular reference signal simultaneously. Determining the angular position of the target includes determining a phase shift difference from spacing and position of fringes in the interference pattern. The angular position corresponds to the phase shift difference. Optionally, determining the angular position of the target includes correcting the angular position for Doppler distortion of the interference pattern.

Optionally, the method also includes determining a target range based on a round trip travel time of the reflected circular reference signal.

Optionally the method further includes identifying the target based on a plurality of ratios of frequencies of the plurality of acoustic echoes. The plurality of ratios of frequencies provide a means of cataloging a target's signature. Optionally, identifying the target includes comparing the target's signature to a plurality of known signatures.

Optionally, the method according to an embodiment of the invention is further described with reference by way of illustration to FIG. 3. As indicated in block 200, the method includes receiving full time series signal received at the input channel. As indicated in block 210, the method includes initial filtering of the full time series signal received at the input channel using a standard zero-phase filter to generate a non-pulse-compressed signal. The zero-phase filter includes standard zero-phase, infinite-impulse response ("IIR") filters and serves to prevent phase distortion that could negatively impact later phase calculations. As indicated in block 220, the method includes pulse compressing the non-pulse-compressed signal, i.e., the initial filtered full time series signal, using standard pulse compression techniques to generate a pulse compressed signal. Examples of such pulse compression techniques includes standard cross-correlation techniques and standard deconvolution techniques. One of ordinary skill in the art will readily appreciate that the selection among the standard pulse compression techniques depends on the user's application of the instant invention. In an embodiment of the invention, the selected pulse compression technique employs the reflected circular reference signal and does not employ the reflected unipolar spiral probe signal. As indicated in block 230, the method includes applying peak detection to the pulse compressed signal using standard peak detection techniques. In an embodiment of the invention, the selected standard peak detection technique includes focusing on peaks due to the reflected circular reference signal and rejecting peaks due to the reflected unipolar spiral probe signal to prevent duplication. As indicated in block 240, the method includes windowing the non-pulse-compressed signal using standard windowing techniques. Such windowing techniques include applying a plurality of weights to the non-pulse-compressed signal. The windowing is performed to isolate the reflected circular reference signal and the reflected unipolar spiral probe signal for each peak detection determined in block 230. In an embodiment of the invention, the separation time between windows is fixed and is relative to the reflected circular reference signal. The Fourier Transform of the windowed signals provides a spectral response of the target. The magnitude of the weights is used in method block 270, discussed below. As indicated in block 250, the method includes correcting velocity of the windowed non-pulse-compressed signal to generate a velocity-corrected, windowed non-pulse-compressed signal. In an embodiment of the invention optionally using two reference signals, the time difference between the two reference signals is compared to the expected time difference to determine the radial velocity of the target. The radial velocity introduces a phase correction as a function of frequency. This phase correction as a function of frequency is applied directly to the windowed non-pulse-compressed signal or is applied by resampling the windowed non-pulse-compressed signal. As indicated in block 260, the method includes determining the phase differences of the velocity-corrected, windowed non-pulse-compressed signal at each measured frequency. Determining the phases are is performed, for example, by taking the standard Fourier Transform ("FT") of the velocity-corrected, windowed non-pulse-compressed signal of the probe and reference signals and subtracting their phases at each frequency. As indicated in block 270, the method includes weighted averaging the phases of the FT across frequency by using the magnitude of the spectral response as weights obtained during the windowing block 240.

All embodiments of the instant invention include an acoustic probe element 30 including a standard spiral wave front source. The spiral wave front source emits a radial signal in which the phase varies linearly with the aspect and can be written $$p(R, \theta, \phi) = \rho c k Q \frac{e^{ikR}}{R} \Theta(\theta) e^{-i\phi} \qquad 1$$

where k is the wave number in the medium, p is the density of the medium, c is the sound speed, Q, is the source strength, and R, θ, and φ are the traditional spherical coordinates. The θ dependence, Θ(θ) is a function of the transducer geometry. For the simple case of two crossed dipoles, Θ(θ) is cos(θ). Standard transducer arrays capable of generating spiral wave front signals have been developed and manufactured for standard applications, such as standard navigation applications. Examples of such standard transducer arrays are discussed in B. R. Dzikowicz, "Underwater acoustic beacon and method of operating same for navigation," 7406001, 29 Jul. 2008. D. A. Brown. B. Aronov, and C. L. Bachand, "Acoustic transducers for underwater navigation and communication," 8638640, 28 Jan. 2014; and B. R. Dzikowicz and B. T. Hefner, "Aspect determination using a transducer with a spiral wavefront: Prototype and experimental results," *J Acoust Soc Am, vol. 125, no. 4, pp. 2540-2540, 2009*, all of which are incorporated herein by reference. These transducer arrays also have an independent channel capable of producing a reference signal of similar beam pattern and bandwidth to the spiral wave signal, but with constant phase across aspect. These transducer arrays have been used successfully as navigation beacons. The simplest of these arrays have a total of only three channels, two to generate the spiral signal and one to generate the reference signal. In a sonar application, such as presented here, the ability to determine a target's aspect and range can be accomplished with only four channels, three for the source and an additional hydrophone channel used on reception.

Spiral sonar operation according to an embodiment of the invention begins with the emission of a reference and a spiral waveform from the source array. Ideally, the two signals should have the same spectral content and vary only by the aspect dependent phase shift present in the spiral signal. In an embodiment of the invention, the signals are emitted in such a way that they can be later separated by signal processing. This is typically accomplished by sending them one after another in rapid succession, such that the target field changes little between target echoes.

The backscattered echo is received by a single hydrophone co-located with the source array and the ranges to scatterers are determined by time-of-flight. The difference between the phase shifts of the spiral echoes and the reference echoes gives the aspect to the scatterers within the spiral sonar's field. The ranges, aspects, and amplitudes of the echoes can be further processed to form images for the ease of viewing. The spectral content of the returns can also be used to inform classification algorithms.

This approach is not confounded by variations in the target scattering responses as the same scattering response affects the reference and spiral signals with the same phase and amplitude shifts and it is the relative phase shift that is measured. Thus, the technique works as well on returns from target reverberation as it does on the specular echo, which may have much different frequency components.

An illustrative method of operation of an embodiment of the invention is described as follows.

The apparatus according to an embodiment of the invention includes a transducer array 25, as shown in FIG. 1. In this embodiment of the invention, the transducer element includes the probe element 30 and the reference element 40. For example, the transducer element 25 includes a standard BTech BT-SWI sonar transducer array including a standard two-channel crossed dipole spiral source and a standard reference source formed from two ring standard transducers, one above and one below the spiral source, such as discussed in U.S. Patent Publication No. 2011/0110197 to Brown and U.S. Patent Publication No. 2012/0236689 to Brown et al, both of which are incorporate herein by reference. The transducer, for example, is housed in a cylinder. This geometric configuration of the cylinder, for example, gives the reference signal the same acoustic center as the spiral source, eliminating the phase error due to dislocation of the two sources. The backscattered signal is received by at least one acoustic receiver 50. The at least one acoustic receiver 50, for example, includes a standard sonar hydrophone.

For example, a second standard hydrophone, such as BTech BT-2RCL-OS hydrophone with receiving sensitivity of −193 dB re 1 V/μPa, is located 4.26 m from the sonar and is used as a reference. The signal received at its location is decoded for angle and is used as a reference aspect angle. Under normal operating conditions, a reference sonar is not required for spiral sonar operation, but it serves as an additional ground truth for testing.

The reference transducer element 40 is driven, for example, with 150 Vpp maximum from a standard Instruments Inc. L6 amplifier, and each of the spiral probe transducer elements 30 is driven, for example, with 150 Vpp maximum from a standard Krohn-Hite 7500 linear amplifier.

For example, in an embodiment of the reference outgoing signal, $s_0(t)$, is a linearly frequency swept pulse with a frequency range on the order of 10 s of kHz and with a duration on the order of tenths of a millisecond. For example, there is a 10% cosine squared shoulder on either end of the reference outgoing signal. Other embodiments of the invention include a longer reference outgoing signal. Longer reference outgoing signals have higher the total energy and the more phase information per pulse than shorter ones, so they are likely to be more appropriate for open water applications.

The spiral source transducer is driven with two signals, one for each of the crossed dipoles. The north-south ("NS") transducer dipole is driven by the reference signal, $s_0(t)$. The east-west ("EW") dipole must be driven out of phase of the first by $\pi/2$ across all frequencies. The EW dipole signal, $s_1(t)$, is derived from the first by first generating the analytic signal of the reference via the Hilbert transform H[ ], phase shifting it by $\pi/2$ then taking the real part.

$$s_1(t) = \text{Re}[(s_0(t) + iH[s_0(t)])e^{i\pi/2}] \qquad 2$$

Regarding outgoing signals for both the reference and spiral transducers, the NS transducer dipole is driven with the same signal as the reference, and the EW dipole is driven with the analytic signal of the reference which has been phase shifted by $\pi/2$.

In an embodiment of the invention, for a single sonar return, the reference signal is transmitted first followed by the spiral signal, for example, 80 ms later. Eighty milliseconds is enough time for reverberation in the tank to settle down to imperceptible levels. A single aspect of datum is collected by averaging the returns from, for example, 64 sonar outputs collected at, for example, 2 Hz. The target is then rotated, for example, 1 degree and allowed to settle for, for example, 30 seconds. A full run of data is taken over, for example, 361 degrees of aspect.

For a sonar processing scheme to be practical in real sonar applications, it cannot rely on prior knowledge of the target's position. Each aspect of data is run through a sequence of signal processing algorithms, or sub-processes, to transform the raw data in to range, aspect and scattering strength values for each target in the field. These sub-processes can be summarized as follows:

1) Peak Detection and Ranging;
2) Separation and Windowing of the reference and spiral returns;
3) Amplitude Determination; and
4) Aspect Determination.

Peak Detection and Ranging

The received time series signal from the input channel of the acoustic receiver 50 is first passed through a standard zero phase bandpass filter with a cosine squared shoulders enclosing the frequencies of the outgoing signal. This removes any spurious signals which may interfere with the remainder of the processing. For example, the first 80 ms contains echoes from the reference transmission only and the following 80 ms from the spiral transmission only. The return signal can then be divided into a reference return and a spiral return at the 80 ms mark. The reference return is pulse compressed using the outgoing reference signal with a hybrid deconvolution algorithm that folds over to a cross correlation when the frequency response is less than 0.1 of the maximum for the reference. Any number of pulse compression algorithms could be used here with thresholds adjusted accordingly.

The pulse compressed data then goes through a peak finding algorithm, for example, which allows for only one detection, the maximum, within a window the size of the outgoing pulse (e.g., 0.25 ms). Peaks within the direct blast region of the outgoing pulse and past 8 m where wall reflections and reverberation begin to take over are neglected. For real sonar applications the peaks can be tracked ping-to-ping using standard tracking algorithms such as standard Kaman or standard particle filters. Here, since ranges do not vary in the tank experiments, the peaks are tracked across sonar aspects allowing for small drifts due to experimental variation.

Separation and Windowing

In an embodiment of the invention, windows based on the peak detector outputs with the same width as the outgoing pulse are applied to the non-pulse compressed signals. These windowed returns are denoted $r_0(t)$ and $r_1(t)$. For real sonar systems, particularly ones on moving platforms, the scene may change enough between the reference and spiral signals that the phase information is corrupted (e.g. through Doppler shifting). Illustrative sophisticated methods of separation are found in DZIKOWICZ et. al., A Spiral Wave Front Beacon for Underwater Navigation: Transducer Prototypes and Testing, J. Acout. Soc. Am., 2012, 132, pp. 3611-3613, American Institute of Physics Publishing, College Park, Md., USA, which is incorporated herein by reference. For moving platforms and to overcome signal distortion from the target scattering response, the best approach is to output three pulses in rapid succession, reference-spiral-reference. With this scheme, range and windowing is determined by following the leading reference signal and the Doppler shifting can be compensated for by comparing the two reference signals.

Amplitude Determination

Each target will have a different frequency dependent scattering response and may even have reverberation returns (such as those caused by leaky surface waves) of narrow frequency band which are picked up by the peak detection and tracking algorithms. However, the spiral sonar technique is expected to be robust to these potential confounders because 1) any phase changes do to scattering that affects the reference will affect the spiral return the same way and 2) the broadband nature of the outgoing signals should compensate for any frequency dropouts. However, narrow band scattering responses and frequency dropouts can bias the phase shift if they are averaged across frequencies without weighting. Thus, determination of the scattering amplitude must be determined by frequency for later computation of phase.

For computational case and to determine the weighting for the phase calculation, the weights, $W_a$, of each frequency band, $f_n$, are defined as the normalized product of the Fourier transforms of the reference and spiral windows.

$$W_n = \frac{R_0(f_n)R_1(f_n)}{\sum_{k=0}^{K-1} R_0(f_k)R_1(f_k)} \qquad 3$$

Capital letters denote the Fourier transforms of the spiral and reference windowed returns. Indexes k and n span the frequency bins in the band of interest. Each window has a unique frequency weighting which is a function of the scattering response of that target. For the total amplitude of the echo, the sum in the denominator of Equation 3 is used.

Aspect Determination

Once the reference and spiral signal for each detection is isolated and the frequency dependent weights determined, the aspect to the target can be determined. First, phase difference for each frequency determined using the Fourier transforms of the windowed signal.

$$\phi(f_n) = \tan^{-1}\left\{\frac{\text{Im}[R_1(f_n)]}{\text{Re}[R_1(f_n)]}\right\} - \tan^{-1}\left\{\frac{\text{Im}[R_0(f_n)]}{\text{Re}[R_0(f_n)]}\right\} \qquad 4$$

An inverse tangent algorithm is used which preserves the phase quadrant (in many computer languages the function a tan 2(y, x)) and the phase carefully unwrapped across frequency to correct for the phase discontinuity. The target aspect, ξ, is then computed by summing over the frequencies and rejecting contributions where the weight is less than 0.1.

$$\xi = \frac{\sum_{n=0}^{N-1} \begin{cases} W_n \phi_n & \text{for } W_n > 0.1 \\ 0 & \text{for } W_n < 0.1 \end{cases}}{\sum_{n=0}^{N-1} \begin{cases} W_n & \text{for } W_n > 0.1 \\ 0 & \text{for } W_n < 0.1 \end{cases}}$$

The resulting phase can be plotted with the true position of the targets.

An embodiment of the invention includes computer program instructions, which computer program instructions embody the steps, functions, filters, and/or subsystems described herein. However, it should be apparent that there could be many different ways of implementing the invention in computer programming, and the invention should not be construed as limited to any one set of computer program instructions. Further, a skilled programmer would be able to write such a computer program to implement an exemplary embodiment based on the appended diagrams and associated description in the application text. Therefore, disclosure of a particular set of program code instructions is not considered necessary for an adequate understanding of how to make and use the invention. The inventive functionality of the claimed computer program will be explained in more detail in the following description read in conjunction with the program flow in the embodiments of the invention described above.

One of ordinary skill in the art will recognize that the methods, systems, and control laws discussed above may be implemented in software as software modules or instructions, in hardware (e.g., a standard application-specific integrated circuit ("ASIC")), or in a combination of software and hardware. The methods, systems, and control laws described herein may be implemented on many different types of processing devices by program code comprising program instructions that are executable by one or more processors. The software program instructions may include source code, object code, machine code, or any other stored data that is operable to cause a processing system to perform methods described herein.

The methods, systems, and control laws may be provided on many different types of standard computer-readable media including standard computer storage mechanisms (e.g., CD-ROM, diskette, RAM, flash memory, computer's hard drive, etc.) that contain instructions for use in execution by a standard processor to perform the methods' operations and implement the systems described herein.

The computer components, software modules, functions and/or data structures described herein may be connected directly or indirectly to each other in order to allow the flow of data needed for their operations. It is also noted that software instructions or a module can be implemented for example as a subroutine unit or code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

Systems and methods disclosed herein may use data signals conveyed using networks (e.g., local area network, wide area network, internet, etc.), fiber optic medium, carrier waves, wireless networks, etc. for communication with one or more data-processing devices. The data signals can carry any or all of the data disclosed herein that is provided to or from a device.

Although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has". "with", or variants thereof are used in the detailed description and/or in the claims, such terms are intended to be inclusive in a manner similar to the term "comprising".

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

What is claimed as new and desired to be protected by Letters Patent of the United States is:

1. An apparatus comprising:
 a uniplanar sonar head comprising:
  at least one probe element being configured to output cooperatively a unipolar spiral probe signal that comprises a spiral acoustic wavefront having a phase that varies linearly with angular position in a plane across at least one frequency;
  at least one reference element being configured to output a circular reference signal that comprises a circular acoustic wavefront having a constant phase relative to angular position in the plane across the at least one frequency; and
  at least one acoustic receiver comprising an input channel being configured to receive a reflected unipolar spiral probe signal and a reflected circular reference signal, the reflected unipolar spiral probe signal and the reflected circular reference signal including a plurality of acoustic echoes respectively generated by the outputted spiral probe signal and the outputted circular reference signal;
 a plurality of amplifiers communicating with said at least one probe element, said at least one reference element, and said at least one acoustic receiver;
 a processor cooperating with said plurality of amplifiers to generate electrical signals to drive the at least one probe element and the at least one reference element and to record the input channel;
 a computer-readable medium storing instructions that, when executed by said processor, cause the processor to carry out a method for detecting a target, the method comprising:
  determining an angular position of the target based on the plurality of acoustic echoes received via the input channel.

2. The apparatus according to claim 1, further comprising:
at least one transducer element comprising said at least one reference element and said at least one receiver element;
a transmit-receive switch cooperating with said processor to switch operation of said at least one transducer element from said at least one reference element to said at least one receiver element.

3. The apparatus according to claim 1, wherein the method further comprises:
transmitting the outputted unipolar spiral probe signal and the outputted circular reference signal sequentially,
wherein said determining the angular position of the target comprises:
determining a phase shift difference between the reflected unipolar spiral probe signal and the reflected circular reference signal by comparing their respective phase responses, the angular position corresponding to a phase of the reflected unipolar spiral probe signal matching a phase of the reflected circular reference signal.

4. The apparatus according to claim 1, the reflected unipolar spiral probe signal and the reflected circular reference signal combining to form an interference pattern, said input channel being configured to receive said interference pattern,
wherein the method further comprises:
transmitting the outputted unipolar spiral probe signal and the outputted circular reference signal simultaneously,
wherein said determining the angular position of the target comprises:
determining a phase shift difference from spacing and position of fringes in the interference pattern, the angular position corresponding to the phase shift difference.

5. The apparatus according to claim 1, wherein the method further comprises:
determining a target range based on a round trip travel time of the reflected circular reference signal.

6. The apparatus according to claim 3,
wherein the method further comprises:
determining a relative radial velocity between the target and a source by measuring a Doppler shift.

7. The apparatus according to claim 6, wherein said determining the angular position of the target comprises:
correcting the angular position for a Doppler shift between the reflected unipolar spiral probe signal and the at least one reflected circular reference.

8. The apparatus according to claim 4, wherein said determining the angular position of the target comprises:
correcting the angular position for Doppler distortion of the interference pattern.

9. The apparatus according to claim 1, wherein the method further comprises:
identifying the target based on a plurality of ratios of frequencies of the plurality of acoustic echoes, the plurality of ratios of frequencies comprising a target signature.

10. The apparatus according to claim 9, wherein said identifying the target comprises comparing the target signature to a plurality of known signatures.

* * * * *